July 17, 1923.

DE WITT E. HOWARD

LATHE CENTER

Filed Feb. 25, 1922

1,462,409

WITNESSES

INVENTOR
De Witt E. Howard

ATTORNEYS

Patented July 17, 1923.

1,462,409

UNITED STATES PATENT OFFICE.

DE WITT E. HOWARD, OF RIDGEWOOD, NEW JERSEY.

LATHE CENTER.

Application filed February 25, 1922. Serial No. 539,246.

*To all whom it may concern:*

Be it known that I, DE WITT E. HOWARD, a citizen of the United States, and a resident of Ridgewood, in the county of Bergen and State of New Jersey, have invented new and useful Improvements in Lathe Centers, of which the following is a full, clear, and exact description.

This invention relates to improvements in lathe centers primarily designed for use in wood turning.

The general object of this invention is the provision of a simple and durable lathe center in which the work receiving spindle is revolubly mounted in a hollow body in such a manner as to prevent any play, and providing in conjunction with the hollow body means for forcing the means for mounting the work receiving spindle out of the body.

A further object is the provision of a lathe center in which the work receiving spindle is rotatably mounted on ball bearings and provided with means for protecting the ball bearings and body from splinters, dust and the like.

These objects are accomplished by providing a hollow body in which the outer ring of a raceway is tightly mounted, and revolubly mounting in said outer raceway ring a work receiving spindle on which a cover plate is mounted that extends back over the body, and providing in conjunction with the body screws which extend therethrough and serve as a means for forcing the outer raceway ring out of the body.

These and other objects of the invention will be more clearly understood from the following detailed description and accompanying drawings.

Figure 1:
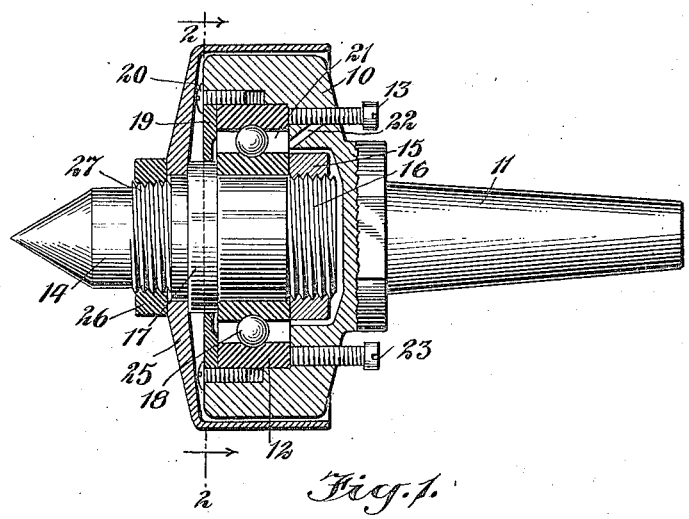
Figure 1 is a vertical section through the lathe center showing the construction of the same.
Figure 2:
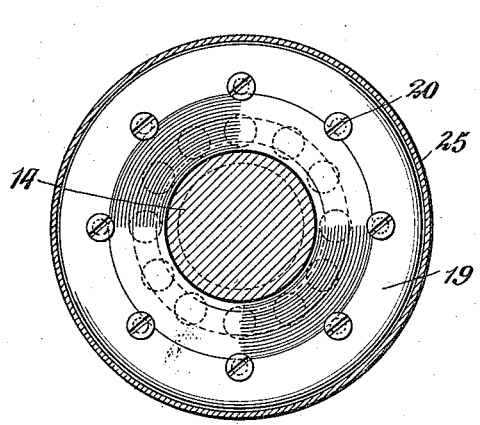
Figure 2 is a section along the line 2—2, Figure 1.
Figure 3:
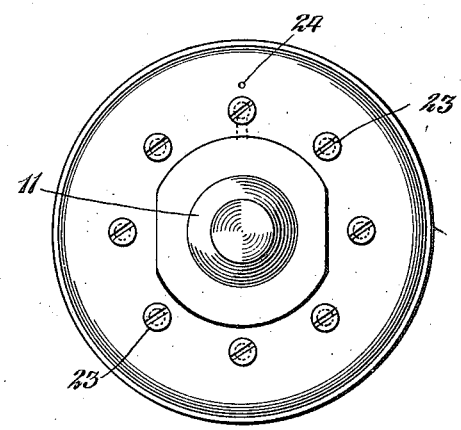
Figure 3 is an end elevation of the lathe center looking at it from the back.

Referring to the above-mentioned drawings, a hollow body 10 is shown with a spindle 11 in conjunction therewith. The spindle 11 is tapered, as is usual in the construction of lathe centers, and serves as a means for mounting the lathe center in the tailstock of the lathe or other similar machine. An outer raceway ring 12 is tightly mounted in the hollow body 10. An inner raceway ring 13 is clamped in position on the work receiving spindle 14 by means of a nut 15 which engages the threaded end 16 of said work receiving spindle, and forces the ring 13 against a collar 17 formed integral with said spindle. This work receiving spindle 14 is revolubly mounted in the hollow body by means of ball bearings 18 interposed between the raceway rings 12 and 13.

A plate 19 is attached to the body 10 by means of screws 20. This plate lies flush with the outer face of the body and contacts with the raceway ring 12 and the collar 17 thus closing the raceway and forming a lubricant chamber 21. A channel 22 extends through the hollow body 10 into the lubricant chamber 21 and through this channel a lubricant may be introduced into said chamber. A plurality of screws 23 project through the body 10 and engage with the outer raceway ring 12. These screws 23 serve as a means for forcing the outer raceway ring, which is tightly mounted in the body 10, out of the same. One of the screws 23 also serves to close the channel 22 to retain the lubricant in the lubricant chamber 21. A mark 24 is provided on the back wall of the body 10 so as to indicate the screw that closes the channel 22 leading into the lubricant chamber 21.

In order to protect the raceway and the body from splinters and dust, a cover plate 25 is mounted on the work receiving spindle 14. This cover plate is held in position by a clamping nut 26 which holds it in engagement with the collar 17. The clamping nut 26 engages with a threaded portion 27 provided on the front portion of the work receiving spindle 14. Cover plate 25 extends outward and then backward over the body 10. The end of the work receiving spindle 14 is tapered as shown in Figure 1. In this lathe center, as shown in the figures and described above, the outer raceway ring 12 is tightly mounted in the body 10. The plate 19, which is attached to the body by means of the screws 20, bears on the collar 17 and forms the chamber 21 in which the lubricant may be contained. In order to remove the outer raceway ring 12 from the body 10, the screws 23 are forced inward thus forcing the said ring from its position in the body 10.

I would state in conclusion that while the illustrated example constitutes a practical embodiment of my invention I do not limit myself strictly to the exact details herein illustrated since manifestly the same can be considerably varied without departing from the spirit of the invention as defined in the appended claims.

Claims.

1. A lathe center of the class described, comprising a hollow body, a raceway ring tightly mounted in said body, a work receiving spindle having a raceway ring tightly mounted thereon, a plurality of ball bearings interposed between said raceway rings for rotatably mounting the work receiving spindle in the body, means carried by the work receiving spindle for protecting the raceway and body, and a plurality of screws projecting through the body wall and engaging with the outer raceway ring to serve as a means for forcing said ring out of the body.

2. As a new article of manufacture, a lathe center of the class described, comprising a hollow body, an outer raceway ring tightly mounted in said hollow body, a work receiving spindle having an inner raceway ring tightly mounted thereon, a plurality of ball bearings interposed between said raceway rings for rotatably mounting the work receiving spindle in the hollow body, a plate mounted on the body, associated with the raceway and the work receiving spindle, for retaining a lubricant in the raceway, a channel projecting through the back of the body and leading to the raceway for forcing the lubricant into the same, and a plurality of screws projecting through the back of the body end engaging with the outer raceway ring to serve as a means for forcing the same out of the body, one of said screws serving to close the channel provided for lubricating purposes.

3. A lathe center of the character described, comprising a hollow body, a raceway ring mounted in said hollow body, means mounted in the hollow body for retaining said raceway ring in position, a work receiving spindle having a raceway ring tightly mounted thereon, a plurality of ball bearings interposed between said raceway rings for rotatably mounting the work receiving spindle in the body, and means mounted in the hollow body for engaging the outer raceway ring for projecting said ring out of said hollow body.

4. In a lathe center of the character described including a hollow body, a ball bearing mounted in said hollow body, and a work receiving center carried by said ball bearing, means for protecting the ball bearing and hollow body comprising a cover mounted on said work receiving center and extending in front of the ball bearing and over the hollow body portion.

DE WITT E. HOWARD.